(12) United States Patent
Griffiths

(10) Patent No.: US 10,717,934 B2
(45) Date of Patent: Jul. 21, 2020

(54) APPARATUS FOR TREATING WASTE COMPRISING MIXED PLASTIC WASTE

(71) Applicant: Recycling Technologies LTD, Swindon (GB)

(72) Inventor: Adrian Edward Griffiths, Swindon (GB)

(73) Assignee: Recycling Technologies Ltd., Swindon (GB)

( * ) Notice: Subject to any disclaimer, the term of this patent is extended or adjusted under 35 U.S.C. 154(b) by 0 days.

(21) Appl. No.: 16/124,608

(22) Filed: Sep. 7, 2018

(65) Prior Publication Data

US 2019/0010402 A1 Jan. 10, 2019

Related U.S. Application Data

(62) Division of application No. 14/768,066, filed as application No. PCT/GB2013/052849 on Oct. 31, 2013, now Pat. No. 10,093,860.

(30) Foreign Application Priority Data

Feb. 20, 2013 (GB) .................................. 1303005.1

(51) Int. Cl.
*C10B 53/07* (2006.01)
*C10B 49/10* (2006.01)
(Continued)

(52) U.S. Cl.
CPC ................ *C10B 53/07* (2013.01); *B01J 8/44* (2013.01); *C10B 49/10* (2013.01); *C10G 1/002* (2013.01);
(Continued)

(58) Field of Classification Search
CPC . B01J 8/44; C10B 53/07; C10B 49/10; C10G 1/002; C10G 1/10; C10G 31/09;
(Continued)

(56) References Cited

U.S. PATENT DOCUMENTS 504,972 A 9/1893 Dixon
513,117 A 1/1894 Kuersten
(Continued)

FOREIGN PATENT DOCUMENTS

CN 102504855 A 6/2012
CN 102703131 A 10/2012
(Continued)

OTHER PUBLICATIONS

WO9604116A1_ENG (Patentscope machine translation of Kuroki) (Year: 1996).*
(Continued)

*Primary Examiner* — Jonathan Miller
*Assistant Examiner* — Gabriel E Gitman
(74) *Attorney, Agent, or Firm* — Michael A. Bondi; Moss & Barnett

(57) ABSTRACT

A process for treating waste comprising Mixed Plastic Waste is disclosed. The process includes feeding the waste to a pyrolysis reactor, pyrolysing the waste in the pyrolysis reactor to produce a fuel and using the fuel to run a generator to produce electricity.

27 Claims, 3 Drawing Sheets

(51) Int. Cl.
| | |
|---|---|
| *C10G 1/10* | (2006.01) |
| *C10G 31/09* | (2006.01) |
| *C10G 1/00* | (2006.01) |
| *B01J 8/44* | (2006.01) |
| *C10K 1/02* | (2006.01) |
| *F02B 43/08* | (2006.01) |
| *B01J 8/18* | (2006.01) |

(52) U.S. Cl.
CPC ............... *C10G 1/10* (2013.01); *C10G 31/09* (2013.01); *C10K 1/024* (2013.01); *F02B 43/08* (2013.01); *B01J 8/1818* (2013.01); *Y02P 20/143* (2015.11); *Y02T 10/32* (2013.01)

(58) Field of Classification Search
CPC ........ C10K 1/024; F02B 43/08; Y02P 20/143; Y02T 10/32
See application file for complete search history.

(56) References Cited

U.S. PATENT DOCUMENTS

| | | | |
|---|---|---|---|
| 3,336,114 A | 8/1967 | Destremps | |
| 3,977,947 A * | 8/1976 | Pyle | C10B 49/10 201/27 |
| 5,040,972 A * | 8/1991 | Kleinhenz | F23G 5/50 432/72 |
| 5,364,995 A | 11/1994 | Kirkwood | |
| 5,369,947 A | 12/1994 | Dummersdorf | |
| 5,546,875 A * | 8/1996 | Selle | C10L 9/08 110/245 |
| 5,589,599 A | 12/1996 | McMullen | |
| 5,672,794 A | 9/1997 | Northemann | |
| 5,798,496 A | 8/1998 | Eckhoff | |
| 5,807,474 A | 9/1998 | Balai | |
| 5,811,606 A | 9/1998 | Yang | |
| 5,821,395 A | 10/1998 | Price | |
| 5,900,224 A | 5/1999 | Fujimura | |
| 6,005,149 A | 12/1999 | Bishop | |
| 6,011,187 A | 1/2000 | Horizoe | |
| 6,032,467 A | 3/2000 | Oshita | |
| 6,814,940 B1 | 11/2004 | Hiltunen | |
| 7,214,252 B1 | 5/2007 | Krumm | |
| 8,070,863 B2 * | 12/2011 | Tsangaris | C10J 3/00 110/216 |
| 8,420,875 B1 * | 4/2013 | Mackay | C10G 1/02 208/131 |
| 8,500,959 B2 | 8/2013 | Lehto | |
| 9,168,500 B2 | 10/2015 | Jiang | |
| 9,534,174 B2 | 1/2017 | Mazanec | |
| 9,637,695 B2 | 5/2017 | Zwart | |
| 9,707,532 B1 | 7/2017 | Silverman | |
| 10,047,953 B2 | 8/2018 | Sato | |
| 2001/0011438 A1 | 8/2001 | Fujimura | |
| 2003/0047437 A1 * | 3/2003 | Stankevitch | C10B 49/16 201/25 |
| 2003/0130360 A1 * | 7/2003 | Kindig | B01J 7/00 518/703 |
| 2004/0261672 A1 * | 12/2004 | Nusimovich | C10B 47/22 110/341 |
| 2005/0066864 A1 | 3/2005 | Miyoshi | |
| 2005/0144844 A1 | 7/2005 | Miyoshi | |
| 2006/0194990 A1 | 8/2006 | Miyoshi | |
| 2007/0014704 A1 | 1/2007 | Hashimoto | |
| 2008/0196306 A1 * | 8/2008 | van der Meijden | C10J 3/482 48/111 |
| 2008/0230444 A1 | 9/2008 | Iwadate | |
| 2008/0286557 A1 | 11/2008 | Tucker | |
| 2009/0036720 A1 | 2/2009 | Carner | |
| 2009/0078912 A1 * | 3/2009 | Peng | G01N 9/36 252/372 |
| 2009/0242377 A1 | 10/2009 | Honkola | |
| 2010/0256429 A1 * | 10/2010 | Li | C10B 1/10 585/240 |
| 2010/0266464 A1 * | 10/2010 | Sipila | C10B 49/10 422/187 |
| 2010/0289270 A1 | 11/2010 | Behrens | |
| 2010/0293853 A1 | 11/2010 | Feerer | |
| 2011/0035998 A1 | 2/2011 | Badger | |
| 2011/0041388 A1 | 2/2011 | Sipila | |
| 2011/0136971 A1 | 6/2011 | Tucker | |
| 2011/0308155 A1 | 12/2011 | Paskach | |
| 2011/2014505 | 6/2012 | Sweeney | |
| 2012/0312497 A1 * | 12/2012 | Panda | F28D 7/085 165/11.1 |
| 2013/0025281 A1 | 1/2013 | Jiang | |
| 2013/0118885 A1 | 5/2013 | Sarker | |
| 2013/0161563 A1 | 6/2013 | Jiang | |
| 2014/0008205 A1 | 1/2014 | Heydenrych | |
| 2014/0208638 A1 | 7/2014 | Van Thorre | |
| 2014/0223908 A1 | 8/2014 | Sweeney | |
| 2015/0166895 A1 | 6/2015 | Lehto | |
| 2016/0122654 A1 | 5/2016 | Barczyk | |

FOREIGN PATENT DOCUMENTS

| | | | | |
|---|---|---|---|---|
| DE | 271526 A1 | 6/1989 | | |
| DE | 102005063160 A1 | 7/2007 | | |
| EP | 2157075 A1 | 2/2010 | | |
| EP | 2161321 A2 | 3/2010 | | |
| EP | 2754960 A1 | 7/2014 | | |
| FR | 2763341 A1 | 11/1998 | | |
| GB | 2475889 A | 8/2011 | | |
| GB | 2487682 A | 8/2012 | | |
| JP | S57209988 A | 6/1981 | | |
| JP | H0559371 A | 8/1991 | | |
| JP | WO/1996/004116 | * | 2/1996 | ............ C10B 49/18 |
| JP | 2000319671 A | 11/2000 | | |
| JP | 2001323309 A | 11/2001 | | |
| JP | 2002294253 A | 10/2002 | | |
| JP | 2005298602 A | 10/2005 | | |
| JP | 2008133321 A | 6/2008 | | |
| WO | 9844074 A1 | 10/1998 | | |
| WO | 1999032583 A1 | 7/1999 | | |
| WO | 2009053234 A1 | 4/2009 | | |
| WO | 2010053381 A1 | 5/2010 | | |
| WO | 2011004096 A1 | 1/2011 | | |
| WO | 2011019901 A1 | 2/2011 | | |
| WO | 2011140401 A2 | 11/2011 | | |
| WO | 2012012684 A1 | 1/2012 | | |
| WO | 2012034141 A1 | 3/2012 | | |
| WO | 2012066802 A1 | 5/2012 | | |
| WO | 2014040634 A1 | 3/2014 | | |
| WO | 2014200330 A1 | 12/2014 | | |
| WO | 2014072583 A1 | 5/2015 | | |

OTHER PUBLICATIONS

Gnan, J. W. (2010). Emergency and Standby Power Systems. Engineer Educators, Inc. Tallahassee, FL. Accessed Aug. 21, 2017 at https://www.engineereducators.com/docs/EnnergencyAndStandbyPowerSystems.pdf (Year: 2010).*

The Origin and Chemistry of Petroleum. (2001). Chemical Constituents of Petroleum and Its Refined Products. Pace Analytical. Accessed Aug. 15, 2017 at https://www.pacelabs.com/environmental-services/energy-services-forensics/forensics-101-a-primer/the-origin-and-chemistry-of-petroleum.html (Year: 2001).*

Sinn, H., et al., "Processing of Plastic Waste and Scrap Tires into Chemical Raw Materials, Especially by Pyrolysis", 1976, 13 pgs.

The Origin and Chemistry of Petroleum. (2001). Chemical Constituents of Petroleum and Its Refined Products. Pace Analytical. Fig. A-1. Accessed Aug. 15, 2017 at https://www.pacelabs.com/environmental-services/energy-services-forensics/forensics-101-a-primer/the-origin-and-chemistry-of-petroleum.html.

Ghan, J. W. (2010). Emergency and Standby Power Systems. Engineer Educators, Inc. Tallahassee, Florida, p. 12. Accessed Aug. 21, 2017 at https://www.pacelabs.com/environmental-services/energy-services-forensics/forensics-101-a-primer/the-origin-and-chamistry-of-petroleum.html.

(56) References Cited

OTHER PUBLICATIONS

Ma Run Tian, et al., "A Process of Pyrolyzer / Combustor With Fluidized Circulating Bed to Produce Gas and Thermal Power", Aerospace Power Systems, Boston, Aug. 4-9, 1991, [Proceedings of the Intersociety Energy Conversion Engineering Conference], New York, IEEE, US, vol. 5, Aug. 4, 1991, pp. 519-526, XP000308740, ISBN: 78-0-89448-163-5.

Extended European Search Report, received in EP Serial No. 19217988.5 dated Mar. 27, 2020, 9 pgs.

\* cited by examiner

APPARATUS FOR TREATING WASTE COMPRISING MIXED PLASTIC WASTE

REFERENCE TO RELATED APPLICATIONS

This application is a divisional of U.S. application Ser. No. 14/768,066, filed on Aug. 14, 2015, which claims priority to PCT Applic. No. PCT/GB2013/052849, filed on Oct. 31, 2013, which claims priority to U.K. Applic. No. 1303005.1, filed on Feb. 20, 2013, the contents of which are incorporated herein by reference.

FIELD OF THE INVENTION

The present invention concerns processes and apparatus for the treatment of waste comprising Mixed Plastic Waste.

BACKGROUND OF THE INVENTION

In many countries, waste material is collected and taken to processing centres or recycling centres. Some categories of waste are separated out and sent to recycling processes, either at the centre or elsewhere. For example, waste glass is commonly recycled. Waste that is not recycled may be sent to landfill or may be burnt, typically to provide either heat or electrical energy.

Large amounts of plastic are used in modern goods and packaging and there is therefore a large quantity of plastic waste, typically termed Mixed Plastic Waste, passing through recycling centres. Typically, PET and HDPE are separated out for recycling and the remainder is sent to landfill. However, landfill may not be a popular option and there therefore exists a need to find other ways of dealing with Mixed Plastic Waste, either on its own or combined with organic material as Municipal Solid Waste.

Some solutions have been proposed for Mixed Plastic Waste. For example, Mixed Plastic Waste may be used as a fuel in a power station. However, the cost of electricity generated in such a way may be ten times the cost of electricity generated from a conventional fossil fuel, such as natural gas. It may also be difficult to use all the heat produced in such processes and much of it is therefore dissipated in cooling towers. The combination of low efficiency and high capital cost can make such solutions unattractive.

Pyrolysis of Mixed Plastic waste has been suggested as a solution. Examples include the use of pyrolysis to create fuel for vehicles, combining pyrolysis with plasma treatment to produce hydrogen and pyrolysis for disposal of plastic waste at sea. However, such processes may suffer from drawbacks, including the difficulty of producing a uniform, high-quality product from a highly variable feed such as waste and the difficulty of effectively using all the pyrolysis products.

The present invention seeks to mitigate the above-mentioned problems. Alternatively or additionally, the present invention seeks to provide an improved process and apparatus for the treatment of waste comprising Mixed Plastic Waste.

SUMMARY OF THE INVENTION

According to a first aspect of the invention, there is provided a process for treating waste comprising Mixed Plastic Waste, the process comprising:
feeding the waste to a pyrolysis reactor;
pyrolysing the waste in the pyrolysis reactor to produce a fuel; and
using the fuel to run a generator to produce electricity.

By pyrolysing the waste, it is possible to create a fuel that powers a standard engine, for example a marine diesel engine attached to a generator. Such a process may be advantageous in that the capital cost of setting up such a process may be lower than for a bespoke combustion process.

Mixed Plastic Waste will be understood to be a mixture of waste plastics. That mixture of plastics could originate from separate streams of plastics or could originate from a single stream of comingled plastics. In many cases, Mixed Plastic Waste will result from domestic refuse, such as that traditionally collected in black bags in the UK. Such 'black bag waste', or Municipal Solid Waste, will comprise Mixed Plastic Waste. It may be that the Municipal Solid Waste is fed to the process, but advantageously some separation occurs to remove waste, such as glass and certain plastics, such as HDPE and PET, that can be recycled before feeding the waste to the process. The separations that occur may depend on what other facilities are available to recycle or otherwise use parts of the incoming waste to the facility. Thus, at some facilities, the waste fed to the process may be Municipal Solid Waste. At some facilities the waste fed to the process may be Mixed Plastic Waste. At some facilities the waste fed to the process may comprise greater than 10 wt % Mixed Plastic Waste or greater than 20 wt % Mixed Plastic Waste. Preferably the waste fed to the process comprises greater than 30 wt % Mixed Plastic Waste, more preferably greater than 40 wt % Mixed Plastic Waste, more preferably greater than 50 wt % Mixed Plastic Waste, more preferably greater than 60 wt % Mixed Plastic Waste, more preferably greater than 70 wt % Mixed Plastic Waste, more preferably greater than 80 wt % Mixed Plastic Waste and more preferably greater than 90 wt % Mixed Plastic Waste. It will be appreciated that waste comprising a high percentage of Mixed Plastic Waste may be advantageous because of a high energy density and also because such waste may be difficult to treat in other ways and may typically be sent to landfill. It may be that the waste further comprises organic waste. Advantageously the waste may contain greater than 70 wt % organic waste. Such waste may count as biomass for the purpose of government schemes such as the Renewable Obligations Certificate scheme in the UK. In such cases, the waste preferably comprises greater than 5 wt %, more preferably greater than 10 wt %, even more preferably greater than 20 wt % and still more preferably greater than 25 wt % Mixed Plastic Waste. Advantageously the waste composition is such that there is sufficient organic waste to qualify as biomass but that substantially the remainder of the waste is Mixed Plastic Waste so as to increase the energy density.

Preferably the process comprises passing the fuel through a condenser to form a liquid fraction and a gas fraction and using the liquid fraction of the fuel to run the generator. Using liquid fuel in the generator is preferable from a cost and simplicity point of view. Liquid fuels may be easier to store and handle and may be used in a wide variety of generators.

Preferably the process comprises storing the fuel in a buffer tank prior to using it to run the generator. The buffer tank is, for example, a tank in which the level of the fuel can vary. In that way, variations in the rate at which the fuel is produced and consumed can be accommodated by allowing the reserve of fuel stored in the buffer tank to increase or decrease. That may be particularly advantageous in a process such as the present invention, as it may be most efficient to run the pyrolysis reactor at a constant rate so as to achieve a steady operating state, but the demand for electricity varies through the day. Thus the quantity of fuel in the buffer tank is allowed to increase at times of low electricity demand and to decrease at times of high electricity demand. For example, it may be that the fuel is produced continuously and the generator is run intermittently. It will be appreciated that continuous production means that the process for producing the fuel is run continuously over an extended period of time such as days, weeks or months.

It may be that the process includes mixing the fuel while it is in the buffer tank. For example, some of the fuel may be drawn from one part of the tank and recirculated to a different part of the tank. If the buffer tank comprises multiple tanks, the mixing may be achieved by circulating the fuel between the tanks. Mixing the fuel in the buffer tank may smooth out fluctuations in the properties of the fuel that result from variability in the waste fed to the process. That may provide a more uniform heat of combustion of the fuel over time and may also prevent emissions spikes resulting from short-term rises in contamination in the waste feed.

Preferably, the fuel is stored as a liquid and/or as a solid. The fuel may thus be stored as a liquid, a solid, or a mixture of a liquid and a solid. It will be appreciated that heavy fuels, such as bunker fuel commonly used in shipping, may be solid, or a mixture of tarry liquids and solids, at ambient temperatures and become liquid when warmed, for example to around 50° C. Thus such fuels may be stored as a liquid, or a solid or a mixture of a liquid and solid depending on temperature. It will be appreciated that the tank volume required for liquid/solid storage may be significantly smaller than for storing an equivalent amount of fuel (in energy terms) as a gas. Liquid/solid storage may also be intrinsically safer. The process may comprise warming the fuel in the buffer tank so as to transfer, for example pump, it to the generator. The warming may be achieved using heat from the generator, when it is running, or by using an external source of heat, for example at start up.

The buffer tank may comprise a tank container, for example a tank container compatible with ISO standards for intermodal tank containers. Preferably the buffer tank comprises a so-called "20 ft" tank container. Thus the buffer tank may be 6.1 m long and 2.44 m wide and high and mounted in an ISO compatible intermodal container frame. The volume of the tank may be from 14,000 to 27,000 litres. In some embodiments the buffer tank may comprise a plurality of tank containers. Such an arrangement may be advantageous in that a plurality of container tanks may be simpler and cheaper to manufacture and deliver than a single large tank and in that capacity may be straightforwardly added by providing further container tanks. Multiple container tanks may also provide for flexibility in maintenance and operation and be safer than a single large tank.

Preferably the process comprises filtering the fuel to remove chemical contaminants. Emissions from generators may be subject to strict controls and it is possible that fuel produced from waste may contain significant levels of chemical contamination. For example, PVC in the plastic waste may mean that there are undesirable levels of chlorine in the fuel as it exits the pyrolysis reactor.

Other chemical contaminants include fluorine and sulphur. By filtering the fuel, the chemical contamination can be removed before the fuel is used in the generator. The filtering may therefore remove chemicals associated with poor emissions, for example emissions that would contravene the Waste Incineration Directive. The fuel may be filtered in the gas phase. That is, the fuel may exit the pyrolysis reactor as a gas and be filtered in the gas phase before the fuel is condensed. It will be appreciated that the fuel is filtered before it is used in the generator. Thus the filtration occurs before combustion. There may be a significant advantage in filtering the fuel after the pyrolysis but before it is used in the generator. Pyrolysis breaks down the chain lengths of the hydrocarbons in the plastics, resulting in smaller molecules. Combustion, on the other hand combines the hydrocarbons with oxygen, typically from air, which results in a large volume of exhaust gas. The result is that the volume of fuel gas exiting the pyrolysis reactor may be significantly lower than the volume of gas that would be produced by combustion, either of the waste or the subsequent combustion of the fuel in the generator. By cleaning the pyrolysis product the volume of gas to be filtered and cleaned may be lower than the volume of gas that would need to be filtered and cleaned in a combustion exhaust; as a result smaller filters may be used with associated advantages in terms of capital and operating costs.

Preferably the process includes storing the waste in a vessel prior to feeding the waste to the pyrolysis reactor, wherein the waste is blended whilst stored in the vessel. It will be appreciated that waste collected tends to vary in composition from hour to hour and day to day. That may present a particular challenge when trying to convert the waste into a desired product, as the composition of the waste feed may affect the composition and attributes of the product. Even if sophisticated control of the process to adjust operating conditions to compensate for the variable composition of the waste is available, it can still be advantageous to try to minimise the variations in waste composition. By storing the waste in a blended storage tank, variations in composition may be to some extent averaged out. Even if such storage does not completely eliminate variations, it may smooth the rate at which the composition changes, and may therefore allow more time for the control system to apply adjustments.

Preferably the waste is dried in a dryer prior to being fed to the pyrolysis reactor. The dryer may reduce the water content of the waste to less than 5 wt %, preferably less than 3 wt %. The dryer may reduce the water content of the waste to between 2 and 3 wt %. When the waste is fed to the pyrolysis reactor, it is heated to the reaction temperature. Heating any water that is in the waste requires extra energy and therefore it may be advantageous to remove the water in a dryer before the waste is heated. If the fuel is being stored as a liquid, any water in the waste is heated to form steam in the reactor and then condensed again to water in the condenser, resulting in a waste of energy.

Preferably the temperature in the pyrolysis reactor is controlled so as to produce a fuel comprising $C_5$ to $C_{100}$ hydrocarbons. The mean chain length of the fuel, based on the number of molecules, is preferably in the range $C_5$ to $C_{40}$, more preferably in the range $C_{10}$ to $C_{20}$. It may be that 80 wt % of the fuel consists of hydrocarbons with a chain length in the range $C_5$ to $C_{40}$, more preferably in the range $C_5$ to $C_{20}$, more preferably in the range $C_{10}$ to $C_{20}$. Preferably the hydrocarbons in the fuel have a chain length greater than $C_5$. That may be achieved by passing the fuel through a condenser and separating off the part of the fuel that remains as a gas following the condensation (the gas fraction). The liquid fraction may then be used as the fuel and the gas fraction used elsewhere in the process or the host facility.

For example, the fuel may be bunker fuel. It will be appreciated that the composition of the fuel may be selected based on the generator used in the process. The hydrocarbon chain length of the fuel affects the heat of combustion of the fuel. Shorter chain lengths result in a higher heat of combustion. However, at very short chain lengths (for example, less than $C_5$), a small change in chain length can result in a large change in heat of combustion. That can result in control challenges, as, for example, a small decrease in the average chain length of the fuel can lead to a large increase in the energy released when the fuel is combusted and can therefore cause engine failures. Conversely, at very long chain lengths (for example, greater than $C_{40}$) a large change in the average chain length may be required to produce a significant change in heat of combustion. That may lead to control challenges in that large control variations may be needed to produce a noticeable effect on the fuel. The average chain length of the fuel is therefore preferably selected so as to be at a value where changes in the fuel chain length produce a sensible change in the heat of combustion in the fuel. In that way control variations can be used to alter the heat of combustion of the fuel as necessary, but short-term deviations outside the control range do not have catastrophic consequences.

As mentioned above, control of the process may be challenging due to the variability of the waste fed to the process. The process may be controlled by monitoring the waste input or by monitoring the generator but the process is preferably controlled by monitoring an attribute of the fuel and adjusting the temperature and/or the residence time of the pyrolysis reactor in response to the measured attribute of the fuel so as to maintain that attribute within a desired range. It may be that the temperature of the reactor is adjusted. It may be that the residence time of the reactor is adjusted, for example by adjusting the flowrate through the reactor. It may be that both the temperature and the residence time of the reactor are adjusted. Preferably the attribute is related to the heat of combustion, or the calorific value, of the fuel. For example, the attribute may be the heat of combustion of the fuel or it may be a parameter whose value is dependent on the heat of combustion of the fuel. The attribute of the fuel could be measured in the buffer tank, but is preferably measured at the inlet to the tank so as to avoid the large volume of fuel in the tank slowing the response time of the control system. By monitoring the fuel entering the tank, the control system can detect variations in the process more rapidly and apply any necessary adjustment. For example, if the monitor detects that the heat of combustion of the fuel entering the buffer tank is falling, the control system can increase the heat of the reactor or increase the residence time in the reactor. That may be achieved by feeding a greater quantity of the fuel to the burners heating the reactor or by reducing the flowrate through the reactor. Conversely, if the monitor detects that the heat of combustion of the fuel is rising too high, the temperature in the reactor can be decreased or the residence time in the reactor can be decreased.

The heat of combustion of the fuel is preferably controlled using a solvent monitor. Such a system may involve providing a hydrogen flame, feeding a sample of the fuel into the flame and recording the flame temperature. The heat of combustion of the flame may be related to the difference between the flame temperature with the fuel added and the temperature of the hydrogen flame but the process may be controlled more straightforwardly by controlling the process so as to achieve a flame temperature with the fuel added within a desired range. For example, a thermocouple may be provided to monitor the flame temperature and the output from the thermocouple used as an input to the control process for the reactor. Such a system may be a cheap and simple option for monitoring the fuel quality. By monitoring the fuel quality the response time of the control system may be improved. For example, if the control system monitors the generator operation, by the time a decrease in power is observed, a large quantity of sub-standard fuel may already have been produced. That may be particularly the case where the fuel is stored in a buffer tank. Furthermore, it may be more straightforward to monitor the fuel quality, since the fuel is a fluid, than it is to monitor the composition of the incoming waste.

Heat of combustion is a well-known attribute and the skilled person can measure the heat of combustion. For example, the heat of combustion of solids may be measured using methods such as ISO1928:2009 and the heat of combustion of liquid hydrocarbons may be measured using methods such as ASTM D4809. It may be that the heat of combustion of the waste is around 30 MJ/kg, for example in the range 25 MJ/kg to 35 MJ/kg. Preferably the process is controlled so as to produce a fuel having a heat of combustion less than 45 MJ/kg. More preferably the process is controlled so as to produce a fuel having a heat of combustion in the range 42 MJ/kg to 45 MJ/kg, even more preferably 44 MJ/kg to 45 MJ/kg. A fuel with a heat of combustion in that range may be at a point on a curve of heat of combustion against average chain length where controlled variations in the heat of combustion can be achieved by varying the temperature and/or residence time of the pyrolysis reactor so as to vary the average chain length. Fuels below that range may be in a region of the curve where undesirably large changes in reactor conditions are needed to vary the heat of combustion and fuels above that range may be in a region where unavoidable variations in the reactor conditions result in undesirably large fluctuations in the heat of combustion. Nevertheless, it may still be advantageous to operate in the higher or lower regions in some circumstances. For example, at lower heats of combustion the process may be very stable and at higher heats of combustion more power may be available.

The temperature in the reactor may, for example, be in the range 400° C. to 600° C. The reactor may be a fluidised bed reactor, with the fluidised bed having a mass of 2.5 to 8 tonnes, preferably 2.5 to 5 tonnes, more preferably 2.5 to 3.5 tonnes. The reactor or the fluidised bed may have an aspect ratio (height:width) of around 1:1, for example in the range 0.5:1 to 1:2, preferably in the range 0.8:1 to 1:1.2. Such a reactor size, shape and temperature may allow efficient treatment of the waste.

Preferably a product from the pyrolysis reactor is combusted to heat a fluid, the fluid being used to heat the pyrolysis reactor. The fluid may comprise the fuel. For example, a portion of the fuel output stream from the pyrolysis reactor may be directed through a heater, preferably an indirect heater, and back into the pyrolysis reactor.

The product from the pyrolysis reactor may comprise the fuel. The product from the pyrolysis reactor may comprise part of the fuel output stream from the pyrolysis reactor that is not sent to the generator. For example, if the process comprises passing the fuel through a condenser to form a liquid fraction and a gas fraction and using the liquid fraction of the fuel to run the generator, the product combusted to heat the fluid used to heat the pyrolysis reactor may comprise the gas fraction. It may be that the gas fraction is sufficient to heat the pyrolysis reactor but it may be that extra heat is needed, in which case it may be that the gas fraction is supplemented by some of the liquid fraction. The gas fraction is preferably supplemented by a stream of the fuel product from the pyrolysis reactor that is taken from upstream of the condenser. In that way energy is not wasted condensing the fuel only to combust it again immediately to heat the reactor. It may be that the gas fraction exceeds the amount of heat required to heat the pyrolysis reactor. In such cases the excess gas may be used elsewhere or flared.

It may be that the product from the pyrolysis reactor combusted to heat the fluid that is used to heat the pyrolysis reactor is a by-product of the pyrolysis. For example, the product may be char. For example, the pyrolysis reactor may be a fluidised bed reactor and the process may comprise removing a portion of the fluidised bed that has become at least partially coated in char from the reactor, separating the char, returning the portion of the fluidised bed to the reactor and combusting the char to heat a fluid that is used to heat the reactor. By combusting the char to provide the heat, none of the fuel product is used for heating the reactor so the process can provide more energy through the generator.

By combusting part of the product to provide heat, the process does not require a separate fuel source for normal operation. The skilled person will appreciate that for start-up a separate source of heat may still be required. By using combustion of the product to heat a further stream comprising the fuel, with the further stream being introduced into the pyrolysis reactor, the combustion products may be kept out of the reactor. Such an indirect heating system may allow combustion to provide heat, without the reactor becoming contaminated with combustion products.

Preferably the fuel is used to run a first generator and a second generator. For example, the first generator may be run continuously and the second generator run intermittently according to grid demand. It may be that the first generator is smaller than the second generator. It may be that the first generator is larger than the second generator. For example, the first generator may be used to provide continuous power to the host facility in which the process operates and the second generator could be used to produce power to sell to the grid. Preferably the first generator is sized according to the heat or electricity demand of the host facility. Preferably the second generator has a short start-up cycle, for example starting up in less than 10 minutes, so as to be able to provide reserve power to the grid at short notice. The ability to act as part of the grid's reserve may be advantageous in terms of the prices that the grid will pay. It may be that the first generator forms part of a control system, with the generator's performance being monitored and the measured performance being used to control the operating conditions, for example the temperature and residence time of the pyrolysis reactor, of the process.

The generators may, for example, be turbines, preferably gas turbines, but are preferably internal combustion engines attached to generators. For example, the engine may be a marine diesel engine, which may, for example, run on bunker fuel. In such a case, the control system could be calibrated so as to produce bunker fuel in the buffer tank. Combining the use of bunker fuel in a marine diesel with a step of filtering the fuel before it is used in the marine diesel can be advantageous as the cleaned fuel may mean that the emissions from the marine diesel engine are reduced. That may be particularly advantageous, as bunker fuel may be considered to be highly polluting and therefore require expensive exhaust clean-up unless the filtering is used.

Preferably the process treats from 5,000 to 20,000 tonnes per year of waste, more preferably 5,000 to 10,000 tonnes per year of waste and even more preferably 6,000 to 8,000 tonnes per year of waste. For example it may be that the process treats 7,000 tonnes per year of waste. Processes of those sizes can be conveniently combined with existing recycling facilities so as to treat Mixed Plastic Waste on-site, rather than having to transport the waste to another, larger facility such as a power station. Transporting waste uses energy and may therefore reduce or eliminate the environmental benefit of subsequent treatment. Preferably the process produces from 1.8 to 10 MW, more preferably 1.8 to 5 MW and even more preferably 2.1 to 4 MW. For example, it may be that the process produces from 2.5 to 3.5 MW of electricity.

Preferably the process includes cooling the exhaust from the generator by heat exchange with an air stream, wherein at least part of the air stream is used to provide heat elsewhere in the process or elsewhere in the host facility in which the process is carried out. For example, the air stream may be used to provide heat in the dryer, thus improving the overall efficiency of the process.

The generator may be cooled by heat exchange, for example indirect heat exchange with a fluid stream and at least part of that fluid stream may then be used to provide heat to another part of the process, for example the dryer, or to another process in the host facility. Preferably the generator is cooled by heat exchange with a water stream, wherein at least part of the water stream is used to provide heat elsewhere in the process or elsewhere in the host facility.

Preferably the pyrolysis reactor is a fluidised bed reactor. For example, the pyrolysis reactor may contain a fluidised bed of particles, such as sand, and a distributor for feeding a fluidisation medium into the reactor. The fluidisation medium may, for example, be recycled pyrolysis product, which may have been heated in order to supply energy to the pyrolysis reactor. The distributor design may be an important part of the fluidised bed design so as to achieve a uniform distribution of the fluidising medium across the bed. Moreover, the fluidised bed may accumulate contaminants over time and the particles of the bed, for example sand, may need cleaning. For example, tar, char or coke may accumulate on the particles. The cleaning could be achieved by shutting down the reactor and removing the particles, but it is advantageously performed on-line by a recirculation of the particles through a cleaning system. The distributor is preferably configured so as to allow a portion of the fluidised particles to fall through the distributor and the process preferably comprises removing a portion of the particles that have fallen through the distributor, cleaning the particles and feeding the particles back into the reactor. In that way a continuous recirculation of the particles through the cleaning apparatus may be achieved. For example, the distributor may comprise an array of ducts with orifices, for example in their surface, the ducts being configured such that the fluidising medium is fed to the ducts and exits the ducts through the orifices into the reactor, wherein the array of ducts is configured such that the particles can fall between the ducts. The ducts may for example be arranged in a row or a grid, with the spacing between the ducts being selected so as to allow the particles to pass between the ducts. It will be appreciated that steps may be taken to prevent the particles that are falling from the fluidised bed falling into, and blocking, the orifices. The orifices may, for example, be in the underside of the ducts. In another example, the orifices may comprise a nozzle comprising a cap to prevent particles blocking the orifice.

It will be appreciated that using the heat from the generator may provide significant advantages in terms of efficiency. As well as providing electrical power to the host facility, the generator can also supply heat to the host facility. Such a 'combined heat and power' approach allows the energy in the fuel to be efficiently transformed into useful energy for the host facility. Thus, in a broad aspect of the invention there is provided a process for treating waste comprising Mixed Plastic Waste at a host facility, the process comprising:

providing an apparatus comprising a pyrolysis reactor and a generator at the host facility;

feeding the waste to a pyrolysis reactor;

pyrolysing the waste in the pyrolysis reactor to produce a fuel; and using the fuel to run a generator to produce energy.

It may be that the energy is electrical energy; that is the generator is run to produce electricity. It may be that the energy is heat energy. Preferably the energy is both electrical and heat energy. Such a 'combined heat and power' approach may be advantageous because the generator may require cooling even if being run to produce electricity and it may therefore be advantageous to make use of the heat energy as well. The host facility may be a site having energy demands. Preferably the energy is used within the host facility. For example, the host facility may be a recycling plant and the energy may be used in other parts of the recycling process.

It will be appreciated that controlling the process is an inventive feature of the process in its own right and may be particularly important when there is significant variability in the waste feed. Thus, in a second aspect of the invention there is provided a process for treating waste comprising Mixed Plastic Waste, the process comprising:

feeding the waste to a pyrolysis reactor;

pyrolysing the waste in the pyrolysis reactor to produce a fuel;

monitoring an attribute of the fuel; and adjusting the temperature and/or residence time of the pyrolysis reactor in response to the measured attribute of the fuel so as to maintain the attribute within a desired range.

Preferably the attribute is related to the heat of combustion of the fuel.

The design of the distributor is an inventive feature of the process in its own right. Thus, in a third aspect of the invention there is provided a process for treating waste comprising Mixed Plastic Waste, the process comprising:

feeding the waste to a pyrolysis reactor, the pyrolysis reactor being a fluidised bed reactor; and pyrolysing the waste in the pyrolysis reactor to produce a fuel;

wherein the pyrolysis reactor contains a fluidised bed of particles and a distributor for feeding a fluidisation medium into the reactor, wherein the distributor is configured such that the particles can fall through the distributor and wherein the process comprises removing a portion of the particles that have fallen through the distributor, cleaning the particles and feeding the particles back into the reactor.

Heating the pyrolysis reactor is an inventive feature of the process in its own right. Thus, according to a fourth aspect of the invention there is provided a process for treating waste comprising Mixed Plastic Waste, the process comprising:

feeding the waste to a pyrolysis reactor, for example a fluidised bed reactor; and pyrolysing the waste in the pyrolysis reactor to produce a fuel; and combusting a product from the pyrolysis reactor to heat a fluid, and feeding the fluid into the pyrolysis reactor so as to heat the pyrolysis reactor.

It may be that the product is a by-product, for example char. It may be that the product comprises the fuel. It may be that the product comprises a part of the fuel output stream from the pyrolysis reactor that is not used to run the generator.

The processes of the above aspects of the invention are particularly suited to use in small to moderate sized recycling facilities, where they complement the facilities already present. For example, the electricity and heat generated by the process of the above aspects of the invention can be used to power recycling operations at the centre. Thus, according to a fifth aspect of the invention there is provided a process for recycling waste material, the process comprising a process for treating waste comprising Mixed Plastic Waste according to any of the above aspects of the invention.

It will be appreciated that the process of the invention is carried out at a site, or host facility, for example a recycling or waste processing facility. According to a sixth aspect of the invention there is provided an apparatus for treating waste comprising Mixed Plastic Waste, the apparatus comprising:

a pyrolysis reactor for pyrolysing the waste to produce a fuel; and a generator configured to run on the fuel to produce electricity.

Preferably the apparatus comprises a condenser downstream of the pyrolysis reactor and upstream of the generator for condensing the fuel prior to using it to run the generator.

Preferably the apparatus comprises a buffer tank downstream of the pyrolysis reactor and upstream of the generator for storing the fuel prior to using it to run the generator.

Preferably the apparatus comprises a filter system downstream of the pyrolysis reactor and upstream of the generator for filtering the fuel to remove chemical contaminants.

Preferably the apparatus includes a storage vessel upstream of the pyrolysis reactor for storing the waste prior to feeding the waste to the pyrolysis reactor, wherein the storage vessel comprises a blending system for blending the waste stored in the vessel.

Preferably the apparatus comprises a dryer upstream of the pyrolysis reactor for drying the waste.

Preferably the apparatus comprises:

a monitor, preferably a solvent monitor, for monitoring an attribute of the fuel; and a controller for adjusting the temperature and/or residence time of the pyrolysis reactor in response to the measured attribute of the fuel so as to maintain the attribute within a desired range. Preferably the attribute is related to the heat of combustion of the fuel.

Preferably the apparatus comprises a combustor to combust a product from the pyrolysis reactor to heat a fluid that is fed into the pyrolysis reactor to heat the pyrolysis reactor. It may be that the product is a by-product, for example char. It may be that the product comprises the fuel. It may be that the product comprises a part of the fuel output stream from the pyrolysis reactor that is not used to run the generator.

Preferably the generator comprises an internal combustion engine, for example a marine diesel engine.

Preferably the apparatus is sized and configured to treat from 5,000 to 20,000 tonnes per year of waste, more preferably 5,000 to 10,000 tonnes per year of waste and even more preferably 6,000 to 8,000 tonnes per year of waste.

Preferably the apparatus is sized and configured to produce from 1.8 to 10 MW, more preferably 1.8 to 5 MW and even more preferably 2.1 to 4 MW. For example, it may be that the process produces from 2.5 to 3.5 MW of electricity.

Preferably the pyrolysis reactor is a fluidised bed reactor.

Preferably the pyrolysis reactor is configured to contain a fluidised bed of particles and the apparatus comprises a distributor for feeding a fluidisation medium into the reactor, wherein the distributor is configured such that the particles can fall through the distributor and wherein the pyrolysis reactor includes an outlet, such as a rotary valve, through which, in use, a portion of the particles that have fallen through the distributor can be removed, an apparatus for cleaning the particles and an inlet through which the cleaned particles can be fed back into the reactor. The inlet is preferably above the distributor in the fluidised bed reactor.

Preferably the distributor comprises an array of ducts with orifices in their surface, wherein the ducts in the array are spaced apart such that, in use, the particles can fall between the ducts.

According to a seventh aspect of the invention there is provided an apparatus for treating waste comprising Mixed Plastic Waste, the apparatus comprising:
  a pyrolysis reactor for pyrolysing the waste to produce a fuel;
  a monitor for monitoring an attribute of the fuel; and
  a controller for adjusting the temperature and/or residence time of the pyrolysis reactor in response to the measured attribute of the fuel so as to maintain the attribute within a desired range.

Preferably the attribute is related to the heat of combustion of the fuel.

According to an eighth aspect of the invention there is provided an apparatus for treating waste comprising Mixed Plastic Waste, the apparatus comprising:
  a pyrolysis reactor for pyrolysing the waste to produce a fuel, the pyrolysis reactor being a fluidised bed reactor;
  wherein the pyrolysis reactor is configured to contain a fluidised bed of particles and wherein the apparatus comprises a distributor for feeding a fluidisation medium into the reactor, wherein the distributor is configured such that the particles can fall through the distributor and wherein the pyrolysis reactor includes an outlet through which, in use, a portion of the particles that have fallen through the distributor can be removed, an apparatus for cleaning the particles and an inlet through which the cleaned particles can be fed back into the reactor.

According to a ninth aspect of the invention there is provided an apparatus for treating waste comprising Mixed Plastic Waste, the apparatus comprising:
  a pyrolysis reactor for pyrolysing the waste to produce a fuel, for example a fluidised bed reactor; and
  a combustor to combust a product from the pyrolysis reactor to heat a fluid that is fed into the pyrolysis reactor to heat the pyrolysis reactor.

It may be that the product is a by-product, for example char. It may be that the product comprises the fuel. It may be that the product comprises a part of the fuel output stream from the pyrolysis reactor that is not used to run the generator.

Advantageously the apparatus is portable in that it is constructed in such a way that it can be broken down into a number of modules, each of which is transportable. For example elements of the apparatus may be individually mounted in frames compatible with the ISO standards for freight containers to create modules that can be individually transported using equipment designed for the handling of freight containers. The modules may be made at a factory facility and then shipped to the location in which they are to be used, where they are connected together with other modules to form the apparatus. That may be a cost effective system of providing the apparatus at the location and may reduce the need for skilled labour at the location to install the apparatus. In some examples, the apparatus may be employed at a first location to treat a volume of waste stored at the first location, before being dismantled and transported to a second location to treat a volume of waste stored at that second location. In that way, a number of small waste collection facilities may be serviced on a rotational basis, rather than shipping the waste to a central location. In some examples the apparatus may be mounted in a portable manner, for example on a ship, so that the apparatus can be operated whilst the ship is in motion. Advantageously such an apparatus could be used to treat large islands of plastic waste that accumulate in the oceans.

According to a tenth aspect of the invention there is therefore provided an apparatus for treating waste comprising Mixed Plastic Waste, the apparatus comprising:
  a pyrolysis reactor for pyrolysing the waste to produce a fuel, for example a fluidised bed reactor;
  wherein the pyrolysis reactor is mounted in a frame having fittings that are compatible with the load handling equipment used to transport freight containers.

The frame may be part of a freight container; that is, the reactor may be mounted in a freight container, but preferably the frame is an open frame, in that the module has the shape of a freight container and comprises structural members along the module edges but does not include paneling to close the faces of the module. Such a frame may be lighter and allow better access to the equipment.

Preferably the apparatus comprises a generator configured to run on the fuel to produce electricity; wherein the generator is mounted in a frame having fittings that are compatible with the load handling equipment used to transport freight containers.

Preferably the apparatus comprises a buffer tank downstream of the pyrolysis reactor and upstream of the generator for storing the fuel prior to using it to run the generator; wherein the buffer tank is mounted in a frame having fittings that are compatible with the load handling equipment used to transport freight containers.

The apparatus may comprise further elements, for example: filters, dryers or storage tanks with blending systems, as described above in relation to aspects one to nine of the invention. Some or all of those elements may also be mounted in frames having fittings that are compatible with the load handling equipment used to transport freight containers. It may be that, in some frames, more than one element is mounted. Such an arrangement may be advantageous in reducing the number of frames that need transporting. It may be that each element is mounted in a separate frame. Such an arrangement may be advantageous in allowing exchangeability of components.

According to an eleventh aspect of the invention there is provided a recycling plant for recycling waste material, the plant comprising an apparatus for treating waste comprising Mixed Plastic Waste according to any of the above aspects of the invention. Preferably the recycling plant is sized to process from 5,000 to 100,000 tonnes of waste material per year. As such the recycling plant may be an existing facility serving a city or a group of towns and the apparatus may be installed at the plant to provide a process for treating Mixed Plastic Waste, which otherwise would have been sent away from the plant to be treated or landfilled elsewhere.

It will of course be appreciated that features described in relation to one aspect of the present invention may be incorporated into other aspects of the present invention. For example, the apparatus of the invention may incorporate any of the features described with reference to the process of the invention and vice versa. Similarly any process or apparatus aspect of the invention may incorporate any of the features described with reference to other process or apparatus aspects of the invention.

DESCRIPTION OF THE DRAWINGS

Embodiments of the present invention will now be described by way of example only with reference to the accompanying schematic drawings of which.

DETAILED DESCRIPTION

Figure 1:
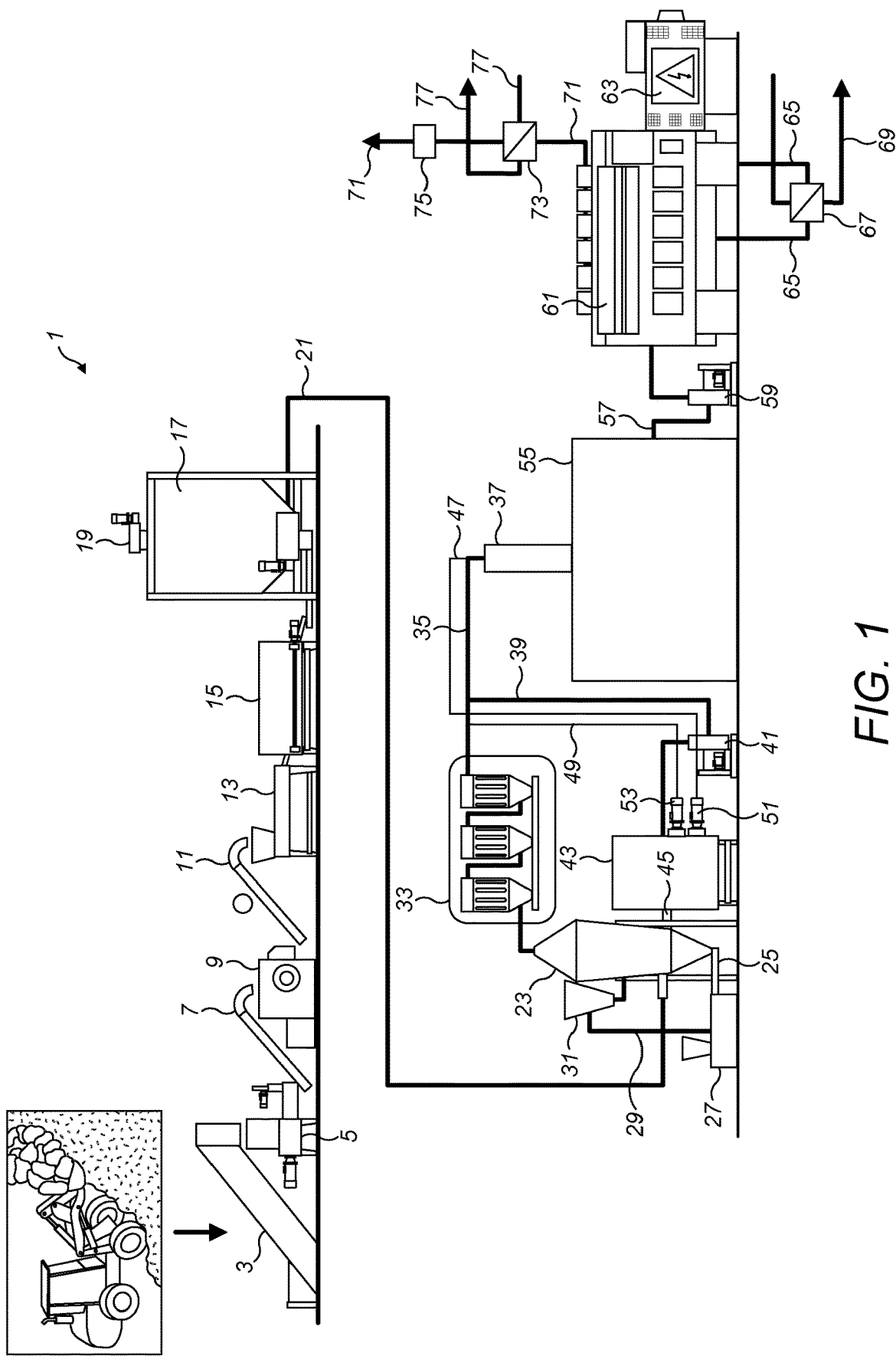
FIG. 1 is a schematic view of an apparatus according to a first embodiment of the invention.

In FIG. 1 an apparatus 1 for treating waste comprising Mixed Plastic Waste has a loading conveyer 3. The loading conveyer 3 feeds a de-water press 5, the outlet of which is arranged above a conveyer 7 to a shredder 9. The outlet of the shredder 9 is directed at a conveyer 11 to a filter 13, which includes a ferrous and non-ferrous filter. The outlet of the filter 13 is connected to a dryer 15 and the outlet of the dryer 15 is connected to a storage tank 17. The storage tank 17 is fed by conveyer 19 and comprises a blending system. The outlet of storage tank 17 is connected via line 21 to the inlet of a fluidised bed pyrolysis reactor 23. The reactor 23 contains sand, which forms the fluidised bed. The bottom of the reactor 23 has a valve connected, via line 25, to a cleaner 27, which in turn is connected, via line 29 to a hopper 31. The hopper 31 feeds into the reactor 23. The outlet from the top of the reactor 23 is connected to hot gas filter 33, the outlet of which is connected, via line 35, to condenser 37.

From line 35, a branch 39 is connected, via pump 41, to heat exchanger 43. From heat exchanger 43 a line 45 feeds into reactor 23. Fuel supply line 49 runs from line 35 to burner 53. Fuel supply line 47 runs from the top of condenser 37 to burner 51. Burners 51 and 53 are mounted on heat exchanger 43.

Condenser 37 is on top of, and feeds into, buffer tank 55. An outlet 57 from the buffer tank 55 is connected, via pump 59, to engine 61, which is attached to generator 63. Engine 61 and generator 63 together form a generator to produce electricity and heat. Cooling water loop 65 runs through engine 61 and heat exchanger 67. Water line 69 passes through heat exchanger 67 and on to another part of the plant. The exhaust 71 from the engine 61 passes through heat exchanger 73 and then filter 75 before being exhausted to the atmosphere. Air line 77 passes through heat exchanger 73 and on to another part of the plant.

Figure 2:
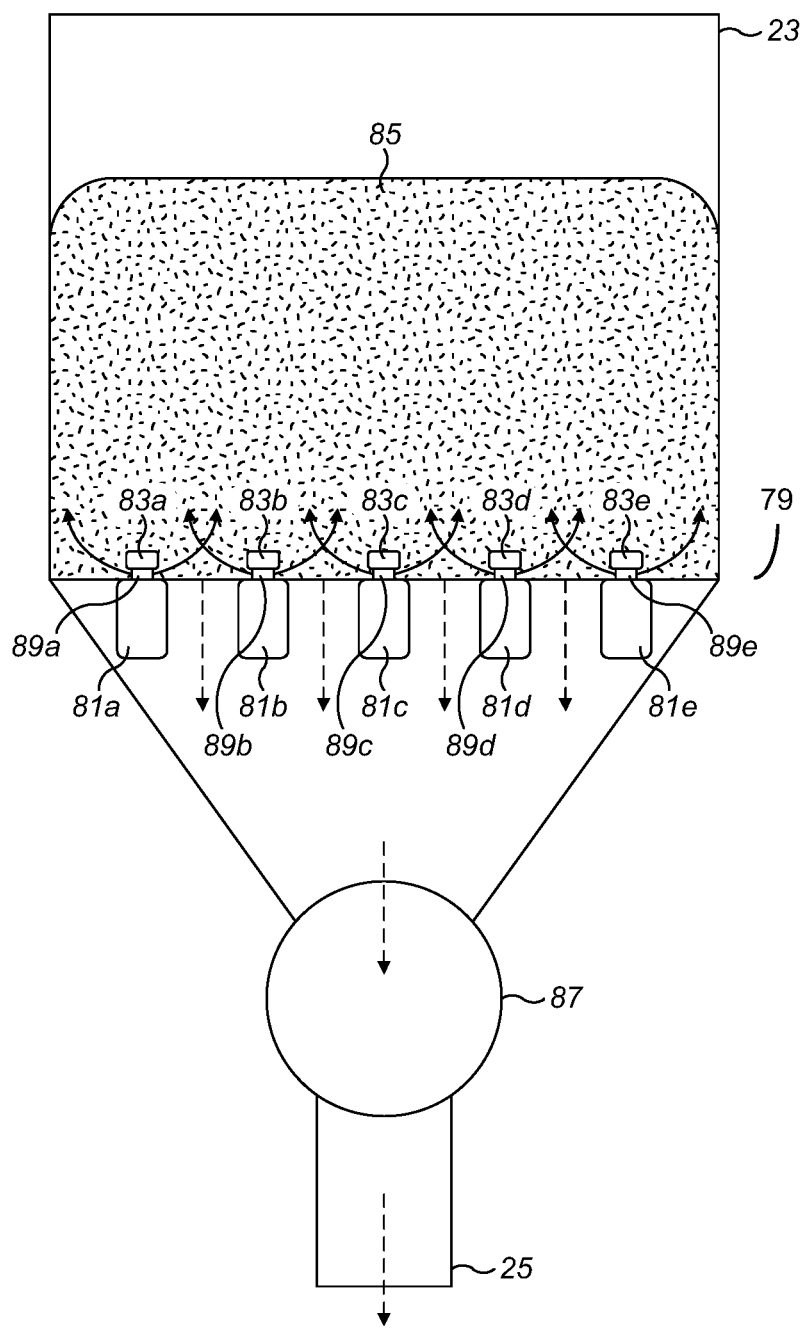
FIG. 2 is a schematic view of a distributor in the pyrolysis reactor of FIG. 1.

In FIG. 2, the lower part of the reactor 23 has a distributor 79. The distributor 79 is at the bottom of the fluidised bed 85. The distributor 79 comprises an array of ducts 81a-e with orifices 89a-e in their upper surface. The orifices comprise nozzles 83a-e, which sit on top of the orifices. The ducts 81a-e are spaced apart such that the gaps between the ducts are large enough for particles from the fluidised bed 85 to fall through. At the bottom of the reactor 23 there is a valve 87 leading to line 25.

Figure 3:
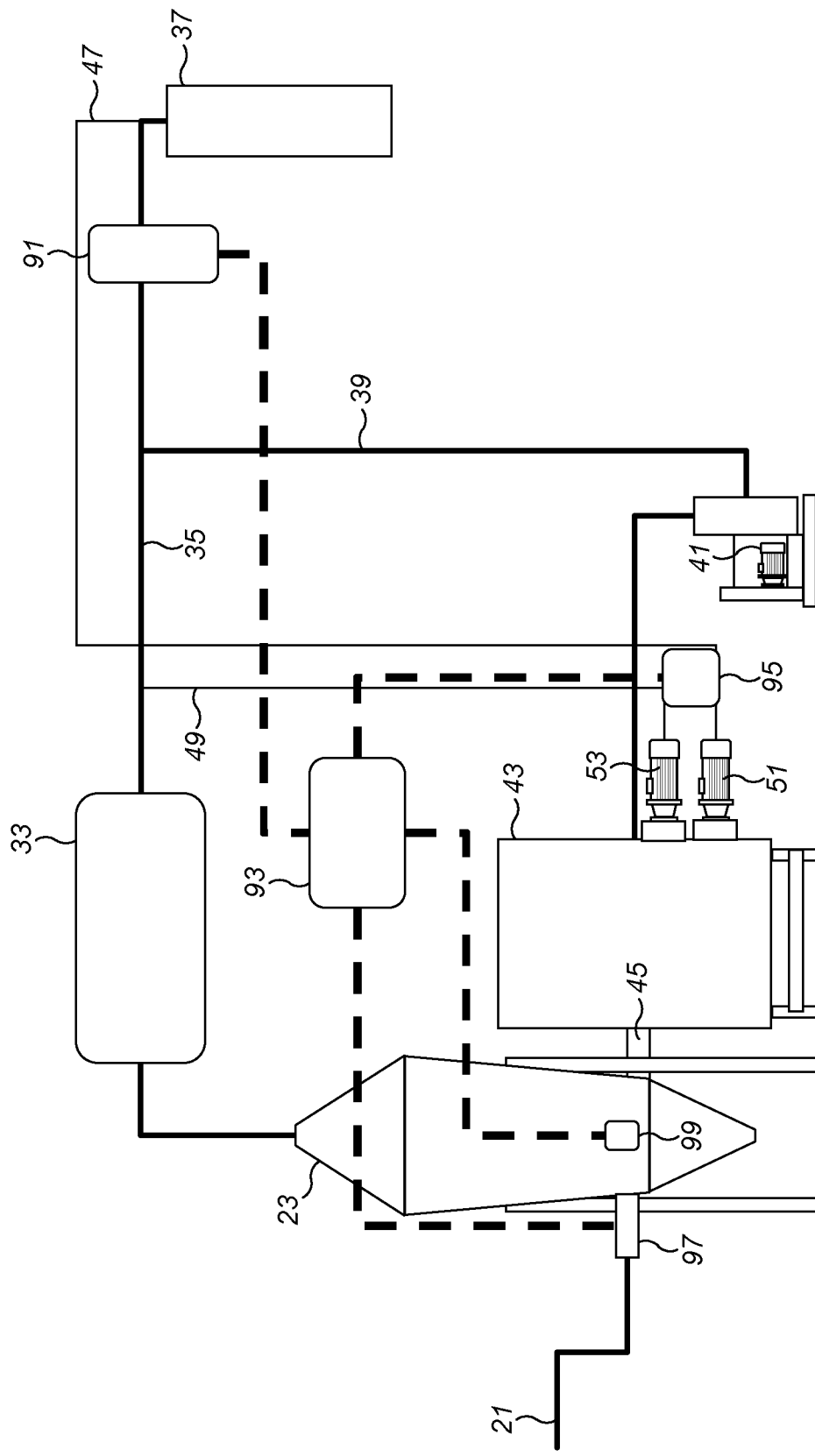
FIG. 3 is a schematic view of a control system for the apparatus of FIG. 1.

In FIG. 3 a solvent monitor 91 is mounted on line 35. The solvent monitor 91 is in communication with reactor management system 93. Temperature monitor 99 is in reactor 23 and is also in communication with reactor management system 93. Reactor management system 93 is in communication with gas burner control 95, which controls burners 51 and 53, and material feed control 97, which controls the feed rate from line 21 into reactor 23.

In use, 7000 tonnes per year of waste, in this embodiment Mixed Plastic Waste, is loaded continuously onto the loading conveyer 3. The waste travels up the loading conveyer 3 and drops into the de-water press 5, where the pressing action forces water out of the waste. The dried waste, which has a moisture content of about 15% by weight exits the de-water press 5 and is conveyed along conveyer 7 and into the shredder 9, where it is shredded. The shredded waste exits shredder 9 and travels along conveyer 11 to filter 13. Filter 13 comprises ferrous and non-ferrous filters and removes metallic contaminants from the waste. The de-watered, shredded and filtered waste then passes into dryer 15, where the water content is reduced to about 2-3 wt %. The dryer 15 is powered by heat from hot water line 69 or hot air line 77, or both. On exiting the dryer 15, the dry, shredded, filtered waste is stored in storage tank 17. Whilst in the storage tank 17, the waste is constantly blended by withdrawing a portion of the waste from the bottom of one end of storage tank 17 and recirculating it to conveyer 19 to be redistributed across the top of storage tank 17. With waste also being continuously added to and withdrawn from storage tank 17 to feed the process, the effect of the blending recirculation is to smooth variations in the composition of the waste over time.

Waste is withdrawn from the storage tank 17 along line 21 and fed to the fluidised bed pyrolysis reactor 23. On entering the reactor 23, the waste is heated to around 400 to 600° C. The heating is achieved by feeding a hot stream into the reactor 23 along line 45. That hot stream comprises pyrolysis product drawn from line 35, along line 39, and heated indirectly by combustion of a portion of the pyrolysis product, which is also drawn from line 35, along line 47 or 49. The portion of the pyrolysis product combusted is normally drawn along line 47 from the top of the condenser 37 and comprises the gas fraction of the fuel output stream 35 from the pyrolysis reactor 23 that does not condense in the condenser 37. When extra fuel is required, it is drawn directly from the fuel output stream in line 35 along line 49. In that case, some of the fuel product that would in normal circumstances be used to run the engine 61 is being used to heat the pyrolysis reactor 23.

The heated waste undergoes a pyrolysis reaction that decreases the hydrocarbon chain lengths to around $C_5$ to $C_{100}$. The process is carried out in a fluidised bed 85 of sand, which results in good mixing and even temperature across the reactor 23. The sand becomes contaminated with by-products over time. To prevent excessive build-up, a portion of the sand is continuously withdrawn from the bottom of reactor 23 along line 25 and cleaned in cleaner 27. The cleaned sand is reheated and fed back into the reactor 23 via line 29 and hopper 31.

The products of the pyrolysis reaction exit the top of the reactor 23 and pass through hot gas filter 33. The filter 33 removes chemical contaminants such as chlorides (resulting from PVC in the Mixed Plastic Waste) and sulphates, resulting in a clean fuel gas which flows along line 35 and is condensed into buffer tank 55 by condenser 37.

The quality of the fuel in line 35 is monitored continuously by solvent monitor 91. Solvent monitor 91 measures a flame temperature resulting from burning a sample of the fuel in a hydrogen flame. The temperature of the flame can be related to the heat of combustion of the fuel. Solvent monitor 91 communicates the flame temperature to reactor management system 93 by means of an electronic signal from a thermocouple in solvent monitor 91. Reactor management system 93 also receives a signal from temperature monitor 99 in the pyrolysis reactor 23. Reactor management system 93 responds to changes in the flame temperature of solvent monitor 91 by adjusting the operation of burners 51 and 53 and the feed rate from line 21 into pyrolysis reactor 23 by means of gas burner control 95 and material feed control 97. In that way, reactor management system 93 can adjust the temperature and/or the residence time of the pyrolysis reactor 23. Thus, if solvent monitor 91 detects that the flame temperature is falling, indicating that the quality of the fuel is falling, the reactor management system 93 increases the temperature in the reactor 23, or increases the residence time in the reactor 23, or both. The average chain length of the fuel in the output from the reactor 23 should then decrease and the quality of the fuel increase. Conversely, if the solvent monitor 91 indicates that the heat of combustion of the fuel is rising, which could cause problems in engine 61, the reactor management system 93 can reduce the temperature or residence time or both of the reactor 23 so as to decrease the pyrolysis of the waste and maintain the flame temperature of the solvent monitor 91 within its desired range.

The level of fuel in buffer tank 55 can be allowed to increase and decrease. Thus the reactor 23 can be run continuously at a constant steady state, but the fuel can be used in a discontinuous way or at a varying rate. At night, when the demand for electricity is low, the level of fuel in the buffer tank 55 rises, whilst at times of peak demand the level of fuel in the buffer tank 55 can be allowed to decrease.

The fuel in buffer tank 55 is continuously recirculated so as to mix the fuel and smooth temporal variations in the quality of the fuel entering the tank 55 from condenser 37. The recirculation also helps to smooth spikes in contaminant concentrations that could otherwise lead to undesirable short term emissions levels.

The fuel from buffer tank 55 is used to run engine 61, which is connected to generator 63. Together, engine 61 and generator 63 form a generator that is run on the fuel to produce electricity. Engine 61 is a marine diesel engine designed to run on bunker fuel and the temperature in reactor 23 is controlled by monitoring the fuel entering condenser 37 so as to achieve the correct fuel specifications for engine 61. By combining the fuel generation process with the electricity generation in a single process, the fuel specification can be relaxed. Engine 61 can be selected based in part on its ability to handle fuel of varying specification with the result that the acceptable specification for the fuel in buffer tank 55 can be broader than if the fuel was to be sold as commercial fuel.

The engine 61 requires cooling and generates hot exhaust gases. The heat from those streams can be captured and used elsewhere in the host facility. In this embodiment, the heat is used in dryer and also in other processes in the host facility. Thus the process provides combined heat and power to the facility. Cooling water circulates through the engine in cooling water line 65. The cooling water cools the engine 61, and is heated in that process. The cooling water then passes to heat exchanger 67, where it is cooled by indirect contact with cool water entering heat exchanger 67 along line 69. The cooled cooling water exits heat exchanger 67 and returns to the engine 61 to repeat the cycle. The water heated in the heat exchanger 67 exits along line 69 and is used to provide heat to the dryer 15 and also to other processes in the host facility. The hot exhaust from the engine 61 is cooled by indirect contact with an air stream in heat exchanger 73. The exhaust gases exit the engine 61 along exhaust line 71 and pass through the heat exchanger 73. Air stream 77 also passes through heat exchanger 73 and heat is passed from the exhaust to the air stream. The exhaust gases then continue along exhaust line 71, through filter 75 to remove contaminants and particulates and are vented to the atmosphere. The air stream 77 that has been heated in heat exchanger 73 is directed to the dryer 15, where the heat in the stream is used to dry the incoming waste, and also to other processes in the host facility that use heat.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Engine 61 and generator 63 may be replaced by other generator systems. For example, in some embodiments a turbine may be used. In some embodiments two generators are provided. A small generator runs continuously to provide a base level of electrical power to run the remainder of the recycling facility in which the apparatus is installed. A large generator is turned on when the national electricity grid requires short-term supplies of electricity. The large generator is selected so as to have a quick start-up cycle so as to benefit from the higher price that national grids are willing to pay for electrical generating capacity that is available at short notice.

In some embodiments the de-watering press 5, shredder 9 and filter 13 are provided in a different order. In some embodiments the waste may be shredded first and then de-watered and filtered. In other embodiments the three steps may be performed in other orders.

In some embodiments the de-watering press 5 is replaced by another de-watering system such as a de-watering centrifuge.

In some embodiments, the fuel gas that is heated to be fed back into the reactor 23 via line 45 in order to heat the incoming waste is drawn from upstream of the hot gas filter 33. The volume of gas passing through the hot gas filter 33 in such embodiments is reduced as a result.

In some embodiments the waste fed to the process comprises Mixed Plastic Waste, but also comprises organic material. In some embodiments the waste is Municipal Solid Waste.

In some embodiments the fuel burners 51 and 53 are replaced or supplemented by burners designed to burn the char separated from the fluidised bed sand in cleaner 27. In that way the char by-product of the pyrolysis process is used to heat the reactor 23.

In some embodiments the buffer tank is a plurality of intermodal "20 ft" tank containers. In an example process, 1 tonne (1000 kg) per hour of waste may be fed to the process and 850 kg per hour of fuel produced by the reactor. A single "20 ft" tank container provides enough storage for around 24 hours of operations with the generator off, for example if the generator is undergoing maintenance.

In another example embodiment the fluidised bed reactor has a 1.5 m diameter and a 1:1 aspect ratio (diameter to height ratio). The reactor contains 3 tonnes of sand.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A mixed plastic waste recycling apparatus configured for conversion of mixed plastic waste into a liquid hydrocarbon product, wherein the mixed plastic waste recycling apparatus comprises:
   a fluidised bed pyrolysis reactor for pyrolysing the mixed plastic waste to produce a pyrolysis product, wherein the fluidised bed pyrolysis reactor is configured to contain a fluidised bed of particulate material;
   a condenser for condensing the pyrolysis product to form a liquid fraction and a gas fraction;
   a monitor for measuring an attribute of the liquid fraction related to heat of combustion; and
   a controller for adjusting at least one of:
      i) a temperature of the fluidised bed of the fluidised bed pyrolysis reactor, and
      ii) a residence time in the fluidised bed of the fluidized bed pyrolysis reactor, in response to the measured attribute of the liquid fraction so as to maintain the attribute within a desired range.

2. The mixed plastic waste recycling apparatus according to claim 1, wherein the apparatus comprises a generator configured to run on the liquid fraction.

3. The mixed plastic waste recycling apparatus according to claim 2, wherein the generator comprises an internal combustion engine and/or a gas turbine.

4. The mixed plastic waste recycling apparatus according to claim 1, wherein the apparatus further comprises a storage vessel upstream of the fluidised bed pyrolysis reactor for storing the waste prior to feeding the mixed plastic waste to the fluidised bed pyrolysis reactor, wherein the storage vessel comprises a blending system for blending the mixed plastic waste stored in the vessel.

5. The mixed plastic waste recycling apparatus according to claim 1, wherein the apparatus further comprises a dryer upstream of the fluidised bed pyrolysis reactor for drying the waste.

6. The mixed plastic waste recycling apparatus according to claim 1, wherein the monitor is a solvent monitor.

7. The mixed plastic waste recycling apparatus according to claim 1, wherein the apparatus further comprises a combustor to combust a product from the fluidised bed pyrolysis reactor to heat a fluid that is fed into the fluidised bed pyrolysis reactor to heat the fluidised bed of the fluidised bed pyrolysis reactor.

8. The mixed plastic waste recycling apparatus according to claim 1, wherein the apparatus is sized and configured to treat from 5,000 to 20,000 tonnes per year of mixed plastic waste.

9. The mixed plastic waste recycling apparatus according to claim 1, wherein the apparatus further comprises a distributor for feeding a fluidisation medium into the fluidised bed pyrolysis reactor, wherein the distributor is configured such that the particulate material can fall through the distributor, wherein the fluidised bed pyrolysis reactor further comprises:
   an outlet through which, in use, a portion of the particle material that has fallen through the distributor can be removed;
   an apparatus for reheating and cleaning the removed particulate material; and
   an inlet through which the reheated and cleaned particulate material can be fed back into the fluidised bed pyrolysis reactor, wherein the inlet is located above the distributor.

10. The mixed plastic waste recycling apparatus according to claim 9, wherein the distributor further comprises an array of ducts with orifices in their surface and wherein the ducts in the array are spaced apart such that, in use, the particulate material can fall between the ducts.

11. The mixed plastic waste recycling apparatus according to claim 1, wherein the mixed plastic waste recycling apparatus further comprises a tank for storing the liquid fraction as a liquid, a solid, or a mixture of a liquid and a solid.

12. The mixed plastic waste recycling apparatus according to claim 1, wherein the monitor for measuring an attribute of the liquid fraction related to heat of combustion is a monitor for measuring hydrocarbon chain length of the liquid fraction, and wherein the controller is for adjusting at least one of:
   i) the temperature of the fluidised bed of the fluidised bed pyrolysis reactor, and
   ii) the residence time in the fluidised bed of the fluidised bed pyrolysis reactor in response to the measured hydrocarbon chain length of the liquid fraction so as to maintain hydrocarbon chain length of the liquid fraction within a desired range.

13. The mixed plastic waste recycling apparatus according to claim 1, wherein the fluidised bed of the fluidised bed pyrolysis reactor has at least one of 1) a mass of 2.5 to 3.5 tonnes, and 2) an aspect ratio (height:width) of about 1:1.

14. The mixed plastic waste recycling apparatus according to claim 1, wherein the fluidised bed pyrolysis reactor is sized and configured to treat about 1,000 kg of waste per hour.

15. A comingled plastics recycling apparatus configured for conversion of comingled plastics into a hydrocarbon product, wherein the comingled plastics recycling apparatus comprises:
   a fluidised bed pyrolysis reactor for pyrolysing the comingled plastics to produce a pyrolysis product, the fluidised bed pyrolysis reactor being configured to contain a fluidised bed of particulate material;
   a condenser for condensing the pyrolysis product to form a liquid fraction;
   a monitor for measuring an attribute of the liquid fraction related to heat of combustion;
   a controller for adjusting at least one of:
      i) a temperature of the fluidised bed of the fluidised bed pyrolysis reactor, and
      ii) a residence time in the fluidised bed of the fluidised bed pyrolysis reactor, in response to the measured attribute related to heat of combustion of the liquid fraction so as to maintain the attribute within a desired range.

16. The comingled plastics recycling apparatus according to claim 15, wherein the apparatus further comprises a tank for storing the liquid fraction as a liquid, a solid, or a mixture of a liquid and a solid.

17. The comingled plastics recycling apparatus according to claim 15, wherein the apparatus further comprises a filter system for filtering the pyrolysis product to remove chemical contaminants.

18. The comingled plastics recycling apparatus according to claim 17, wherein the filter system comprises a hot gas filter.

19. The comingled plastics recycling apparatus according to claim 15, wherein the apparatus further comprises a storage vessel upstream of the fluidised bed pyrolysis reactor for storing the comingled plastics prior to feeding the comingled plastics to the fluidised bed pyrolysis reactor and wherein the storage vessel comprises a blending system for blending the comingled plastics stored in the vessel.

20. The comingled plastics recycling apparatus according to claim 15, wherein the apparatus further comprises a dryer upstream of the fluidised bed pyrolysis reactor for drying the comingled plastics.

21. The comingled plastics recycling apparatus according to claim 15, wherein the apparatus further comprises a combustor to combust a product from the fluidised bed pyrolysis reactor to heat a fluid that is fed into the fluidised bed pyrolysis reactor to heat the fluidised bed of the fluidised bed pyrolysis reactor.

22. The comingled plastics recycling apparatus according to claim 15, further comprising a distributor for feeding a fluidisation medium into the fluidised bed pyrolysis reactor, wherein the distributor is configured such that the particulate material can fall through the distributor and wherein the fluidised bed pyrolysis reactor further comprises:
- an outlet through which, in use, a portion of the particulate material that has fallen through the distributor can be removed;
- an apparatus for reheating and cleaning the removed particular material; and
- an inlet through which the reheated and cleaned particulate material can be fed back into the fluidised bed pyrolysis reactor, wherein the inlet is located above the distributor.

23. The comingled plastics recycling apparatus according to claim 15, wherein the monitor for measuring an attribute of the liquid fraction related to heat of combustion is a monitor for measuring hydrocarbon chain length of the liquid fraction, and wherein the controller is for adjusting at least one of:
  i) the temperature of the fluidised bed of the fluidised bed pyrolysis reactor, and
  ii) the residence time in the fluidised bed of the fluidised bed pyrolysis reactor, in response to the measured hydrocarbon chain length of the liquid fraction so as to maintain hydrocarbon chain length of the liquid fraction within a desired range.

24. The comingled plastics recycling apparatus according to claim 23, wherein the controller is configured to maintain hydrocarbon chain length of the liquid fraction in the range $C_5$ to $C_{40}$.

25. The comingled plastics recycling apparatus according to claim 15, wherein the apparatus is sized and configured to treat from 5,000 to 20,000 tonnes per year of mixed plastic waste.

26. The comingled plastics recycling apparatus according to claim 15, wherein the fluidised bed of the fluidised bed pyrolysis reactor has at least one of 1) a mass of 2.5 to 3.5 tonnes, and 2) an aspect ratio (height:width) of about 1:1.

27. The comingled plastics recycling apparatus according to claim 15, wherein the fluidised bed pyrolysis reactor is sized and configured to treat about 1,000 kg of waste per hour.

* * * * *